United States Patent [19]

Major et al.

[11] Patent Number: 5,150,769
[45] Date of Patent: Sep. 29, 1992

[54] CONTROLLED-FLOW LUBRICATING SYSTEM

[75] Inventors: Kenneth E. Major; John L. Baker; David K. Braunagel, all of Houston, Tex.

[73] Assignees: Hy-Tech Hydraulics, Inc.; Michael P. Breston, both of Houston, Tex.

[21] Appl. No.: 126,307

[22] Filed: Nov. 27, 1987

Related U.S. Application Data

[63] Continuation of Ser. No. 818,503, Jan. 13, 1986, abandoned.

[51] Int. Cl.$^5$ ............................................. F16N 13/20
[52] U.S. Cl. ...................... 184/31; 384/472; 384/473
[58] Field of Search .............. 184/31, 32; 384/471, 384/472, 473, 468; 415/90, 203

[56] References Cited

U.S. PATENT DOCUMENTS

| | | | |
|---|---|---|---|
| 2,604,188 | 7/1952 | Marchant | 415/90 |
| 2,762,664 | 9/1956 | Manning et al. | 384/468 |
| 4,120,541 | 10/1978 | Schiemann | 384/472 |

FOREIGN PATENT DOCUMENTS

| | | |
|---|---|---|
| 631886 | 5/1963 | Belgium . |
| 579061 | 4/1931 | Fed. Rep. of Germany . |
| 836131 | 4/1952 | Fed. Rep. of Germany . |
| 1139705 | 11/1962 | Fed. Rep. of Germany . |
| 316581 | 8/1902 | France . |
| 451714 | 5/1968 | Switzerland . |
| 2084652 | 4/1982 | United Kingdom . |

*Primary Examiner*—Leonard E. Smith
*Attorney, Agent, or Firm*—Michael P. Breston

[57] ABSTRACT

The novel controlled-flow lubricating system utilizes a casing that forms, in use, an enclosed oil well. At least one bearing is disposed inside the well. A shaft is journaled in the bearing. A pumping member is pressed onto the shaft adjacent to the bearing for rotation therewith. Upon rotation with the shaft, the pumping member forcefully injects lubricant from one side to the opposite side of the bearing, thereby flushing, cleaning and lubricating the bearing's engaging surfaces. The preferred pumping member is a circular impeller having a plurality of vanes facing an eccentric cavity in an opposite portion of the wall in the well. This eccentric cavity and the impeller intensify the flow of the recirculating lubricant between the well and the reservoir.

32 Claims, 6 Drawing Sheets

CONTROLLED-FLOW LUBRICATING SYSTEM

This is a continuation of application Ser. No. 06/818,503, filed Jan. 13, 1986, now abandoned.

BACKGROUND OF THE INVENTION
1. Field Of The Invention

The present invention relates in general to a controlled-flow lubricating system which continuously and internally pumps a re-circulating filtered liquid lubricant through and across one or more bearings, and in particular through a bearing which supports the arbor shaft of an abrasive cutting saw.

2. Description Of The Prior Art

In many industrial applications, rolling bearings of the anti-friction type are required to support horizontal and vertical rotatable shafts. In practice, no rolling bearing has a pure rolling contact. The total friction in a bearing is made up of rolling friction, partial sliding, and fluid resistance of the lubricant. This total friction varies somewhat with load, method of lubrication, and the quality and amount of lubricant.

Since rolling friction is inherently low, among the anti-friction bearings those which have the lowest friction coefficients include self-aligning ball bearings, cylindrical roller bearings, and thrust ball bearings.

Improper lubrication will cause wear, pitting, smearing, or corrosion in bearings. Overlubrication will produce excess friction and heat.

The speed of a bearing is the most important factor and is usually limited by the temperature rise that occurs within the bearing at high speeds due to friction. Grease is suitable for low-to-medium speeds, while a liquid lubricant, typically oil, is required for higher bearing speeds.

At low-to-medium speeds, bearing rotation creates turbulence and churning which keeps the bearing surfaces covered with an adequate lubricant film to constantly prevent metal-to-metal contact between the bearing's rolling elements and their raceways.

At higher speeds, however, the centrifugal forces have the damaging effect of depriving the innermost bearing surfaces from receiving a sufficient lubricant film, which may cause an excessive temperature rise requiring that internal heat be removed from the bearing's housing.

Even when a bearing is properly lubricated and protected from foreign matter and overloads, it will ultimately fail from normal fatigue, which is evidenced by a spalling or flaking of one of the raceways or occasionally of the surfaces of the rolling elements themselves.

U.S. Pat. No. 2,950,943 describes a typical system for lubricating anti-friction bearings. It includes an oil bath and a slinger rotatably mounted on the bearing's shaft. Upon rotation, the slinger dips into an oil reservoir and splashes oil around by centrifugal force to create an oil mist in the reservoir which is then directed towards the bearing's rolling elements.

It is well known in the bearing art that slinger lubrication is irregular, non-uniform across the bearing's raceways and across rolling elements, and is incapable of generating sufficient pressure in the oil mist for flushing out foreign debris and wear products which frequently accumulate between the rolling elements and the engaging raceways of the bearing.

Forced feed lubricators have also been suggested but they require at least an external oil reservoir, an external oil pump, a filter, an orifice for directing an oil jet into the bearing, and even a scavenger pump for returning the oil to the reservoir for subsequent recirculation through the bearing.

However, when there is some inadequacy in the design of the bearing, poor shaft mounting, improper lubrication, cooling, and/or flushing, then friction rapidly increases inside the bearing to the great detriment of its rolling elements.

The operational environment is also a very important factor to consider, for example, in the art of abrasive cutting, almost any type of material can be cut when the abrasive blade rotates at a relatively high speed and is dynamically balanced.

For example, the bearings supporting the arbor shaft of a concrete cutting saw must be kept at their peak performance to ensure dynamic balance of its cutting blade. Any flutter of the arbor shaft will accelerate the damage inflicted upon the expensive diamond blade.

In dry abrasive cutting, the peripheral speed of the blade is extremely important. For example, a blade running at a surface speed of 15,000 FPM (feet/min) will be about twice as efficient as a blade operating at 9,000 FPM. But to maintain adequate bearing lubrication at such high speeds is very difficult with the present state of the art, especially for bearings supporting vertical shafts.

SUMMARY OF THE INVENTION

The novel controlled-flow lubricating system utilizes a casing that forms, in use, an enclosed oil well. At least one bearing is disposed inside the well. A shaft is journaled in the bearing. A pumping member is pressed onto the shaft adjacent to the bearing for rotation therewith. A liquid lubricant is contained in a side reservoir from which it can flow into the well by gravity and/or by suction produced by the pumping member.

Upon rotation with the shaft, the pumping member forcefully injects lubricant from one side to the opposite side of the bearing, thereby flushing, cleaning and lubricating the bearing's engaging surfaces.

The preferred pumping member is a circular impeller having a plurality of vanes facing an eccentric cavity in an opposite portion of the wall in the well. This eccentric cavity intensifies the flow of the recirculating lubricant between the well and the reservoir. The lubricant in the reservoir is filtered before it is returned to the well.

For bi-directional shaft rotation, a pair of oppositely-directed eccentric cavities are employed, but only one of the cavities is allowed at any instant to return the intensified and compressed lubricant through a unidirectional flow device to the reservoir, depending upon the direction of shaft rotation. In this manner, pumping action and bearing lubrication can take place regardless of the direction of shaft rotation.

The novel lubricating system lends itself for a bearing supporting a vertical shaft as well as a horizontal shaft, and it is especially adapted for use with a cutting saw utilizing abrasive blades.

BRIEF DESCRIPTION OF THE DRAWINGS

In the accompanying drawings which form part of the specification, like numerals and letters refer to like parts wherever they occur. Also, similar or identical parts are sometimes designated with like numerals followed by a prime ('), to avoid repetitive description.

DETAILED DESCRIPTION OF PREFERRED EMBODIMENTS

Horizontal Shaft Uni-directional Rotation

With reference now to FIGS. 1-8, the novel controlled-flow lubricating system, generally designated as 1, has a housing or casing 2 defining an axial main bore 3.

Figure 1:
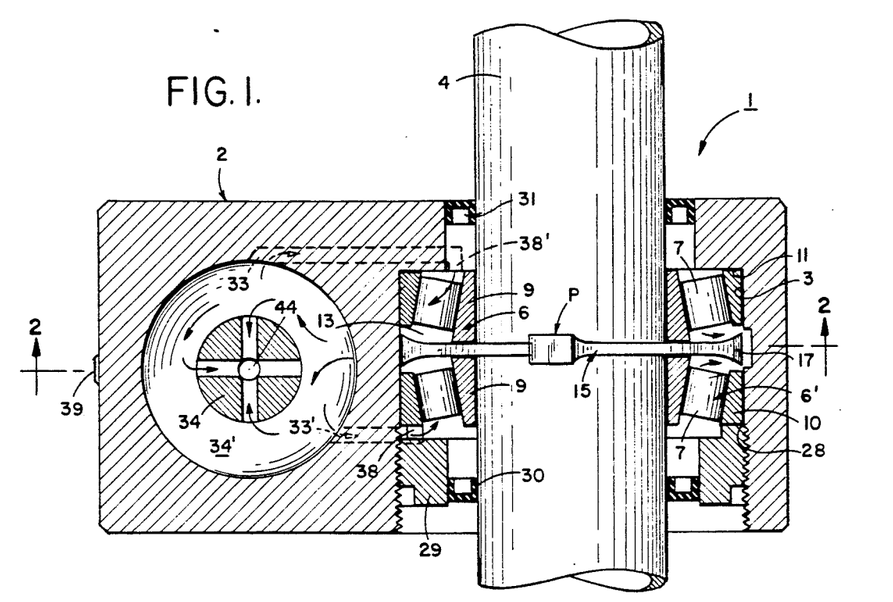
FIG. 1 is a sectional longitudinal view taken on line 1—1 of FIG. 2, of the novel bearing lubricating system utilizing a shaft which rotates in one direction.
Figure 2:
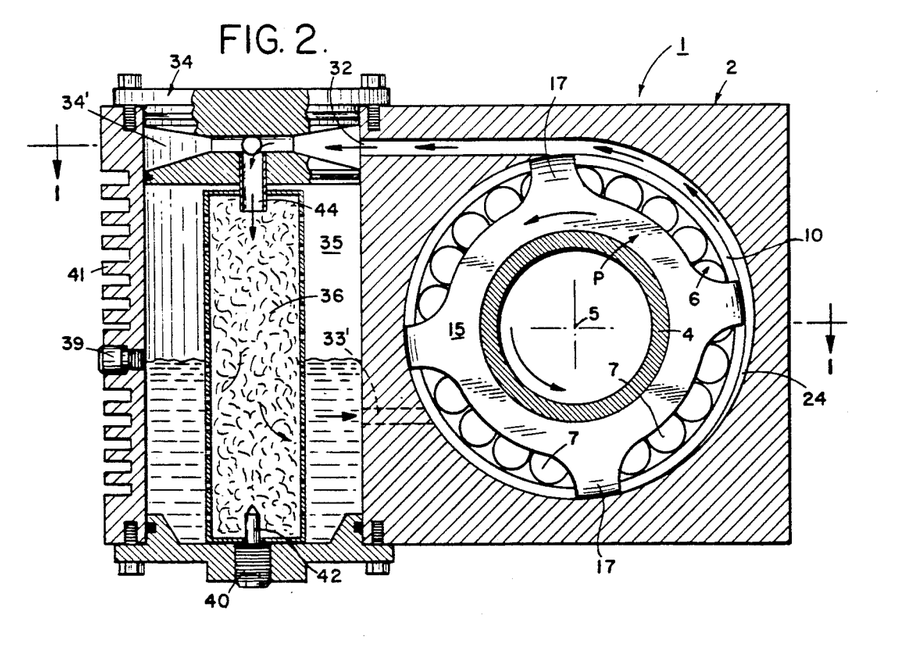
FIG. 2 is a sectional elevational view taken on line 2—2 of FIG. 1.
Figure 3:
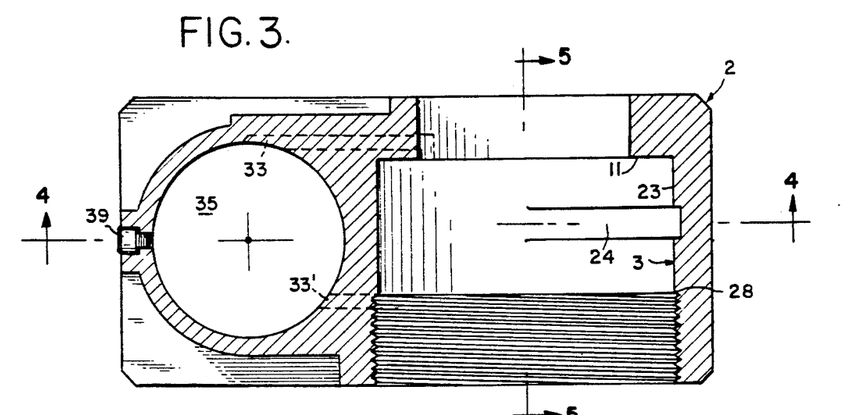
FIG. 3 is a sectional view of the bearing housing taken on line 3—3 of FIG. 4.
Figure 4:
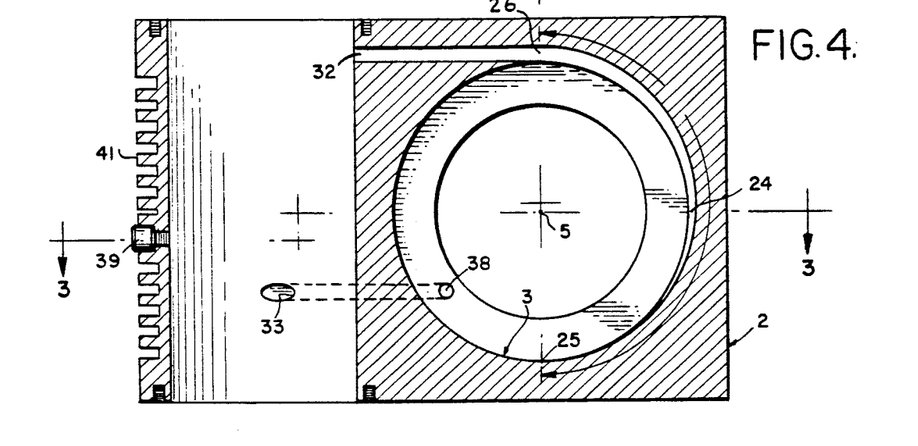
FIG. 4 is a sectional view taken on line 4—4 of FIG. 3.
Figure 5:
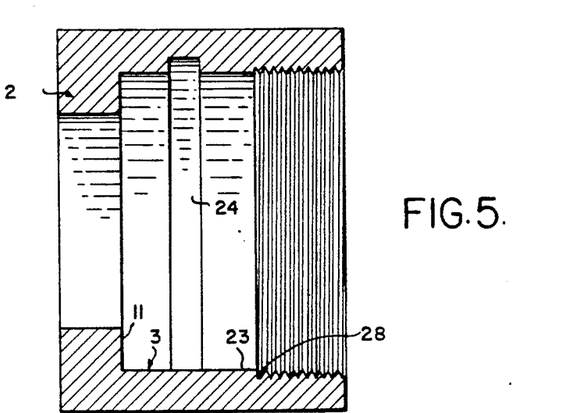
FIG. 5 is a sectional view taken on line 5—5 of FIG. 3.

A horizontal sleeve shaft 4 has a longitudinal axis which extends through the center 5 of bore 3. Shaft 4 is journaled in one or more axially-spaced bearings, generally designated as 6,6', which are illustrated as being conventional, non-frictional, pillow-block bearings whose rollers 7 rotate on the raceways defined by and between an inner ring or race 9 and by an outer race 10. Since the structure of the bearings does not form part of this invention, no detailed description thereof is believed necessary.

The inner race 9 is pressed onto shaft 4 for rotation therewith, and outer race 10 is press fitted against a shoulder 11 inside housing 2.

Rollers 7 and races 9,10 are typically made of hardened alloy steel, usually finished to extremely fine tolerances. For some applications, bearings 6,6' may have a loaded rotating outer race, instead of a loaded rotating inner race.

Bearings 6,6' are disposed inside a chamber or well 13 which forms part of bore 3. A circular pumping member P is concentrically mounted on shaft 4 intermediate back-to-back bearings 6,6'.

Figures 6, 7:
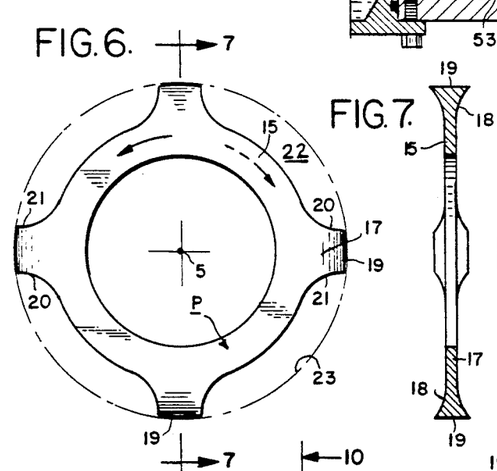
FIG. 6 is a front elevational view of the pumping member.
FIG. 7 is a sectional view taken on line 7—7 of FIG. 6.

Pumping member P is preferably an impeller 15 which has an annular collar or hub 16 which is pressed unto shaft 4 for rotation therewith about its axis 5 in a radially balanced manner. Arcuately and symmetrically spaced about collar 16 are a plurality of radially extending vanes 17, each being characterized by an outwardly flared outer end portion 18 terminating in an arcuate peripheral rim 19 and radial side ribs 20 and 21. Each opposite pair of ribs 20,21 defines a pocket 22 therebetween. The number and shape of vanes 17 on impeller 15 will depend on the speed and lubrication requirements imposed on bearings 6,6'.

Figure 8:
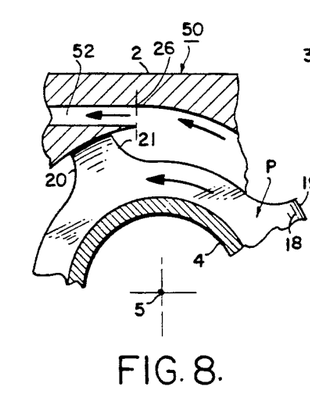
FIG. 8 is an enlarged detail view of the discharge outlet from the pumping member.

Impeller 15, shown in FIGS. 2, 6 and 7, has four vanes and is suitable for medium speeds. Two vanes are sufficient for higher speeds, and eight or more vanes can be used for lower speeds. The outer diameter of impeller 15 corresponds to the diameter of outer race 10. The clearance between each rim 19 and the opposing inner wall 23 of well 13 is only a few millimeters (FIG. 8).

For higher speeds, the pumping member P can be an annular disc 43 (FIGS. 9-10) having an outwardly flared cross section. The pumping member P can also be made to look as an annular brush 43' (FIGS. 11-12) having a hub 16' carrying a clip 12 filled with bristles 8.

In the cylindrical wall 23 of bore 3 is defined an eccentric cavity 24, herein called the "expander", which is positioned partially around and tangentially to rims 19 of vanes 17. Expander 24 starts from a near point 25 and gradually tapers outwardly over an arcuate extent, say 180 degrees, until it smoothly merges at the impeller's discharge outlet 26 with a return passage 27.

One end 28 of main bore 3 is threaded for accepting therein a torque nut 29 which exerts the correct axial pressure against bearings 6,6'. Well 13 in casing 2 is effectively sealed against foreign matter by a pair of end seals 30,31.

Sideways of bore 3 inside casing 2 is situated a reservoir 35 filled with a predetermined amount of a liquid lubricant, such as oil, which is continuously being recirculated through a filter 36.

For a horizontal shaft, the amount of oil needed in reservoir 35 will vary depending primarily on the operational speed of bearings 6,6'. Low RPM requires a higher oil level. If the bearings are overfilled with oil, churning and friction may become excessive. Fresh oil can be added to reservoir 35 several times before the used oil needs to be drained and filter 36 removed.

Two channels 33,33' discharge filtered oil from reservoir 35 to inlets 38,38', which are respectively positioned in back of bearings 6,6' relative to impeller 15. Contaminated oil returns to reservoir 35 via passage 27, a reservoir inlet 32, and a flow guide 34 which channels the oil through a vertical tube 44 into filter element 36.

A fill plug and level indicator 39 is at a convenient outside location on the outside of reservoir 35. At the bottom of the reservoir is a drain plug 40 which carries a magnet 42. When an excessive amount of metal wear particles accumulate on magnet 42, the maintenance operator will become alerted to change the oil, filter, and/or bearings. Heat from the oil in reservoir 35 is dissipated by outside cooling fins 41 on casing 2.

Operation

Throughout the drawings, the solid arrows indicate the actual direction of rotation of impeller 15 and of the corresponding direction of oil flow. The dotted arrows assume a reversal in the rotation of the pumping member and in the flow of the lubricant.

Before shaft 4 starts to rotate, clean cool oil flows due to gravity from discharge channels 33, 33' of reservoir 35 into inlets 38,38' of bearings 6,6', respectively.

The clean oil collects at the bottom of well 13 around the lowermost rollers 7 until the oil level in well 13 matches that of reservoir 35.

When impeller 15 starts to rotate, the accumulated oil inside well 13 starts to flow along the cylindrical wall 23 under the influence of the centrifugal forces produced by pumping member P and its vanes 17. After only a very short time interval, the mass of oil in well 13 starts to rotate.

As the angular shaft velocity increases, the impeller's action on the rotating oil mass increases by an even greater magnitude.

As shaft 4 further accelerates then much stronger centrifugal forces develop. A portion of the oil from well 13 becomes thrown out radially into expander 24 wherein kinetic energy of the oil is converted into pressure energy, while the rest of the oil is trapped within vane pockets 22.

When shaft 4 reaches a constant speed, the oil is sucked in and becomes forcibly injected into bearings 6, 6' at a constant rate, dependent primarily on the speed of shaft 4. The filtered oil flows out through discharge channels 33,33' of reservoir 35 into bearing inlets 38,38'.

Inside each bearing 6 or 6', the oil flows in an axial direction across the raceways and in between rollers 7, and thence into the portion of well 13 which surrounds impeller 15.

As clean oil is being sucked forcefully across the cylindrical rollers 7 and their races 9 and 10 of the bearing 6 or 6', the oil flushes out whatever foreign and wear particles that happen to be inside the bearing and at the same time it cools and lubricates the engaging surfaces thereof.

The Pumping Action

The velocity of the rotating oil in well 13 is gradually being transformed into higher pressure by the action of impeller 15 in cooperation with cavity 24.

It is believed that part of the pressure rise in the oil also comes from the ram effect resulting from the fact that the rotating mass of oil is forced to enter into the reduced area 25 of eccentric cavity 24 which then expands up to discharge outlet 26. Some of the compressed oil flows out from cavity 24 into return passage 27, while the rest of the compressed oil remains trapped within vane pockets 22 after they pass outlet 26 to start a new cycle of operation.

The pressure at the discharge outlet 26 from eccentric cavity 24 is not critical as long as it is sufficient to provide an adequate rate of oil flow across rollers 7 and across their engaging surfaces with raceways 9 and 10 so as to keep them sufficiently cool, clean, and properly lubricated.

The clearances around discharge outlet 26 and the shape of vanes 17 are important parameters in the design of the controlled oil flow across bearings 6, 6'.

The velocity of oil flow induced by the pumping action of impeller 15 varies depending on the size and shape of the impeller, on the arcuate length and taper of eccentric cavity 24, and on the speed of shaft 4 which is the most important factor.

Figure 9:
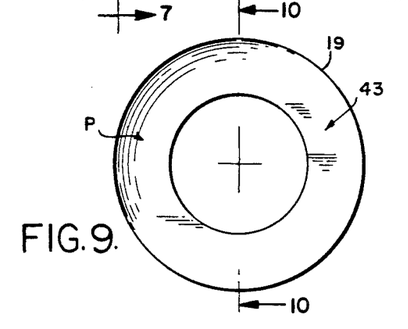
FIG. 9 is a front elevational view of a modified pumping member.
Figures 10, 11, 12:
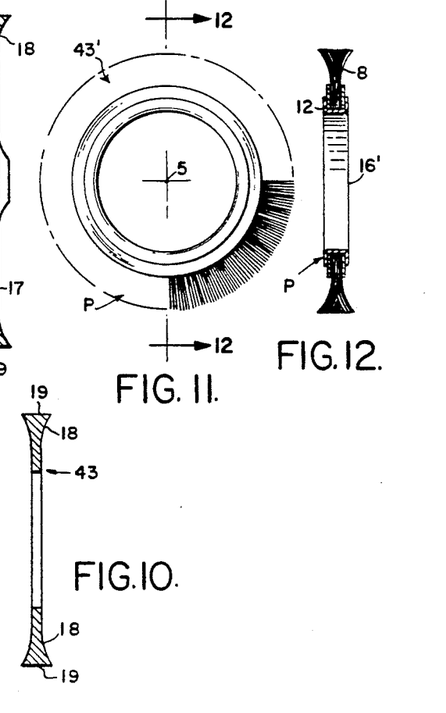
FIG. 10 is a sectional view taken on line 10—10 of FIG. 9.
FIG. 11 is a front elevational view of another pumping member.
FIG. 12 is a sectional view taken on line 12—12 of FIG. 11.

This is the reason why for very high speed operation, the pumping member P can be a disc 43 as in FIG. 9. For a given impeller 15 at a given speed, the pressure at discharge outlet 26 from eccentric cavity 24 stays substantially constant. This is because the pressure level is set by the velocity energy in the rotating mass of oil in well 13, and eccentric cavity 24 merely taps this energy.

Flow velocity and pressure imparted to the oil can be controlled in at least three ways: by changing the taper of eccentric cavity 24, by modifying the vane design, and/or by altering the clearance between rims 19 of vanes 17 and wall 23 of well 13. Hence it is possible by merely interchanging impellers 15 to easily control the rate of oil flowing from one side to the opposite side of the bearing.

Advantages

It will be appreciated that lubricating system 1 is simple in construction and economical to manufacture. It allows increasing the speed of operation without increasing the temperature of the bearing. The lubricating system 1 has the ability to (1) to continuously maintain a film of oil between the engaging surfaces of the bearing, (2) to prevent moisture and foreign matter from penetrating into the bearing, (3) to provide sufficient heat dissipation from the oil, (4) to continuously flush out debris and wear products from the bearing surfaces as they are being used up, and (5) to continuously filter out the contamination from the oil reservoir.

Because clean oil is constantly being circulated through and across bearings 6,6' just in a sufficient amount to meet their lubricating needs, friction losses are kept at a minimum thereby increasing the operational life of the bearings, seals, and other mechanical parts associated therewith.

The novel lubricating system of the invention has the flexibility to become easily adapted for use in a variety of applications.

Modified Embodiments Bi-Directional Rotation

In the embodiments thus far described, shaft 4 is intended to rotate in a single direction say counterclockwise.

In many applications there is a need for the bearings to accommodate bi-directional shaft rotation.

Figure 13:
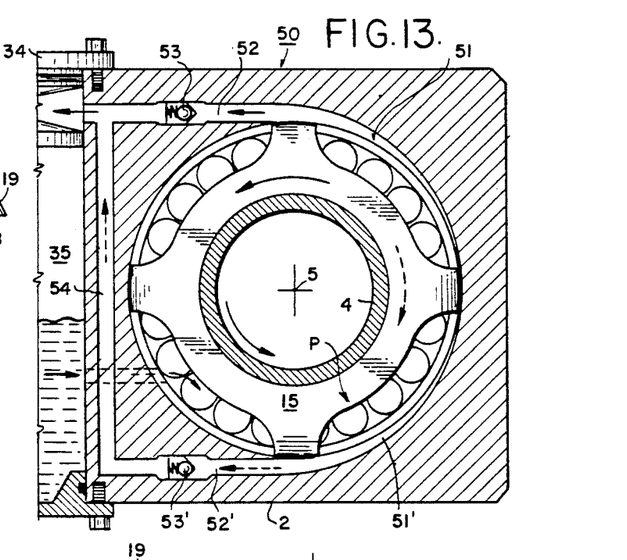
FIG. 13 is an elevational sectional view similar to FIG. 2 of a bi-directional lubricating system.

In FIG. 13 is shown a bi-directional system 50 having a pair of oppositely directed eccentric cavities or expanders 51,51'. Expander 51 feeds into a return passage 52, and expander 51' feeds into a return passage 52'. Passages 52,52' include uni-directional check valves 53,53', respectively, and a common channel 54.

It will be noted that when shaft 4 rotates counterclockwise, the oil pressure in passage 52 will open valve 53 while valve 53' will remain closed. In this manner the recirculating oil will return to reservoir 35 only from and through expander 51.

Conversely, when shaft 4 rotates clockwise, the oil pressure in passage 52' will open valve 53', while valve 53 remains closed. In this manner the recirculating oil will return to reservoir 35 only from and through expander 51' and common channel 54. The inflow of oil from reservoir 35 into bearings 6,6' is the same as in the embodiment shown in FIG. 2.

Figure 14:
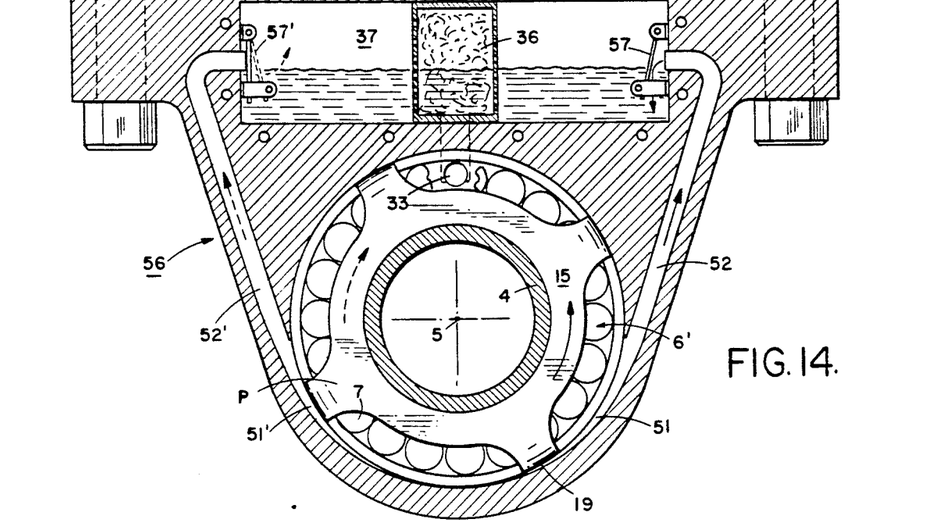
FIG. 14 is an elevational sectional view of a bi-directional lubricating system which has a reservoir above the bearing.
Figure 15:
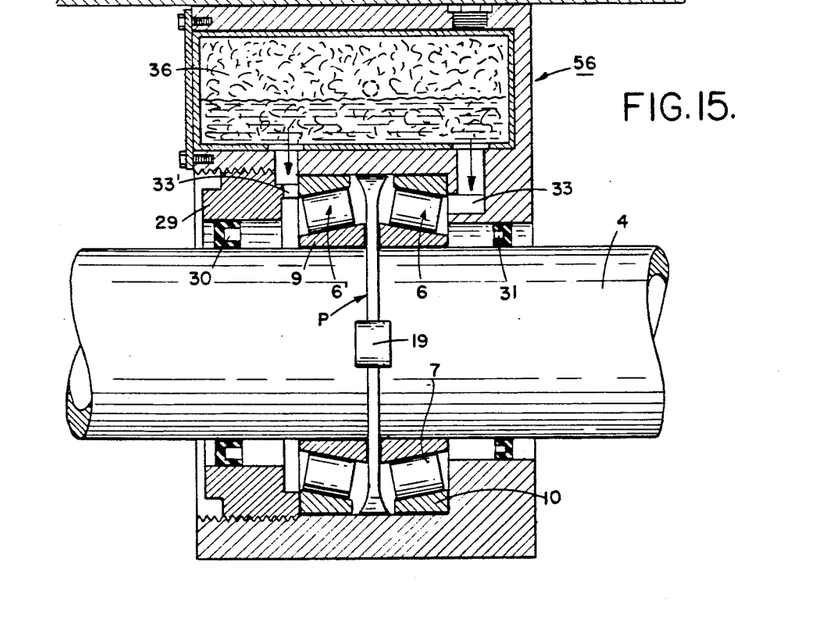
FIG. 15 is a sectional longitudinal view taken on line 15—15 of FIG. 14.

In FIGS. 14–15 is shown a bi-directional lubricating system 56 also having a pair of oppositely directed expanders 51,51'. Expander 51 feeds into a return passage 52 and expander 51' feeds into a return passage 52'. Passages 52,52' lead into flappy door valves 57,57', respectively, which are normally closed except when the pressure of the returning lubricant forces one of them to open.

When shaft 4 rotates counterclockwise, the oil pressure in passage 52 will open flappy door valve 57 and close valve 57'. In this manner, the recirculating oil will return to reservoir 35 only from and through expander 51 and flappy door valve 57.

Conversely, when shaft 4 rotates clockwise, the oil pressure in passage 52' will open flappy door valve 57' and close flappy door valve 57. In this manner, the recirculating oil will return to reservoir 35 only from and through expander 51' and flappy door valve 57. The inflow of oil into bearings 6,6' is the same as that shown in the embodiment of FIG. 1.

It will be noted that in FIG. 14, reservoir 35 is positioned above the bearing's casing 2 so that the oil from reservoir 35 flows by gravity into well 13 and is sucked out therefrom for forced recirculation by the impeller 15.

Figure 16:
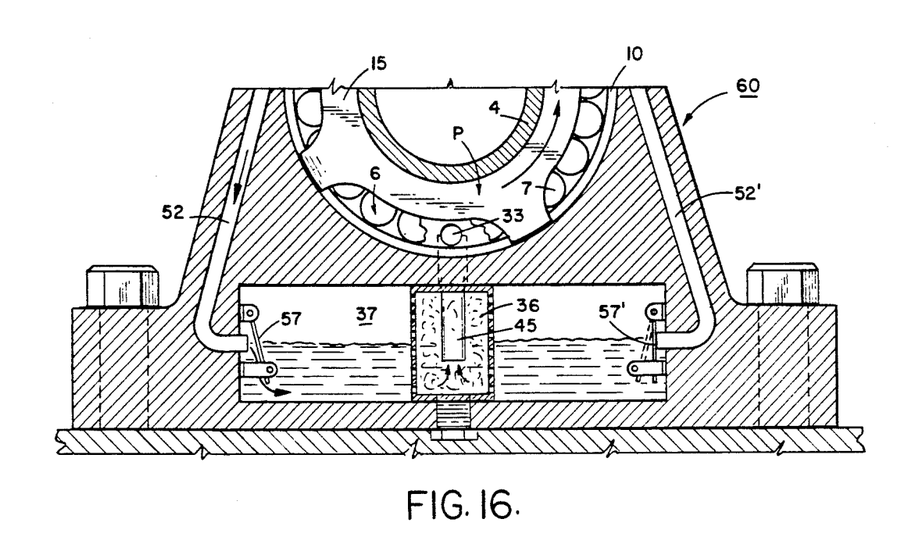
FIG. 16 is an elevational sectional view of a bi-directional lubricating system similar to FIG. 14 but wherein the reservoir is below the bearing.

In FIG. 16 is shown a bi-directional system 60 similar to system 56, having a pair of return passage 52, 52' which lead into flappy door valves 57,57', respectively.

When shaft 4 rotates counterclockwise, the oil pressure in passages 52 will open flappy door valve 57 and close valve 57'. In this manner the recirculating oil will return to reservoir 35 only from and through passage 52 and flappy door valve 57.

Conversely, when shaft 4 rotates clockwise, the oil pressure in passage 52' will open flappy door valve 57' and close flappy door valve 57. In this manner, the recirculating oil will return to reservoir 35 only from and through expander 51' and flappy door valve 57. The oil inflow into the bearings is by suction through tubes 45 which extend from near the bottom of filter 36 and into the rear sides of bearings 6 and 6'.

It will be noted that in FIG. 16, reservoir 35 is positioned below the bearing's casing 2. For this reason reservoir 35 is overfilled with oil so that when shaft 4 is not rotating, the oil in well 13 and in passages 52,52' will reach a level such as to barely cover the lowermost rollers 7.

Upon rotation of shaft 4, lubricant from reservoir 35 quickly fills up well 13 by suction and recirculation of the lubricant takes place. Thereafter, the oil level in the reservoir will fall to a level as shown in FIG. 16.

Figure 17:
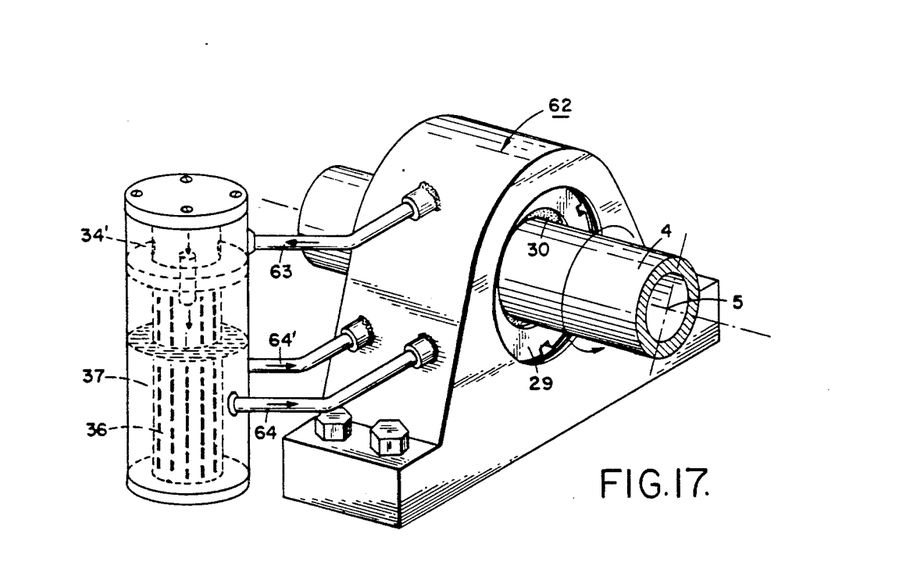
FIG. 17 is a perspective view of a modified lubricating system utilizing a remote oil reservoir.

In the embodiments thus far described, reservoir 35 shares the same housing 2 with bearings 6, 6'. The novel lubricating system of the invention also has the flexibility to become adapted for use with a remote reservoir 37, as shown in the modified system 62 of FIG. 17. Remote reservoir 37 is positioned at a distance from the bearing housing 2. System 62 can accommodate a shaft with either uni-directional or bi-directional rotation. A discharge conduit 63 returns the recirculating oil to reservoir 37 via a flow guide 34', while conduits 64,64' feed oil into the bearings inside casing 2.

Bearings Supporting Vertical Shafts

It is well known in the art of bearing lubrication that when everything else is equal, it is much more difficult to lubricate bearings supporting vertical shafts than bearings supporting horizontal shafts.

In contrast, the lubricating system of the present invention lends itself with equal ease to lubricate both horizontal an vertical shaft support bearings. For example, system 1 will continue to operate properly even when casing 2 and its shaft 4 are rotated 90 degrees from their positions shown in FIGS. 1 and 2.

Figure 18:
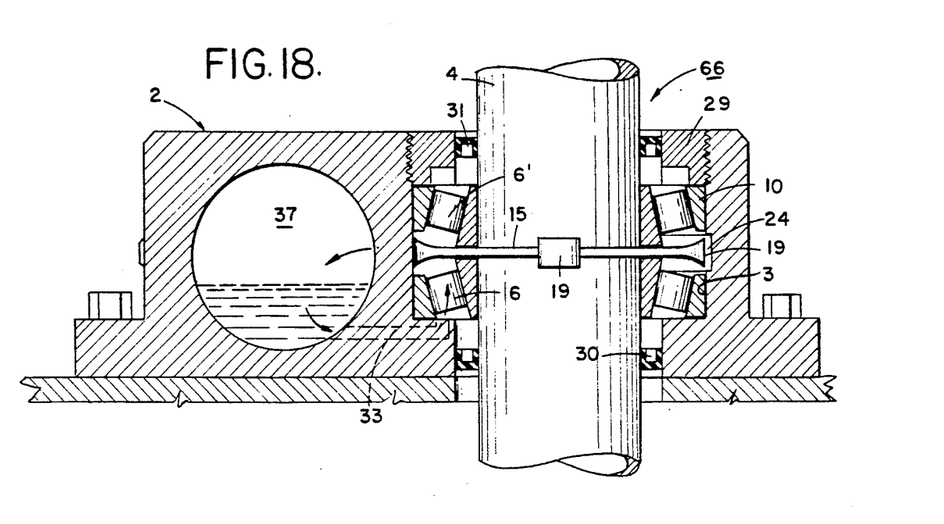
FIG. 18 is sectional elevational view of a lubricating system for bearings supporting a vertical shaft.

In the modified system 66 (FIG. 18), bearings 6,6' support shaft 4 for rotation about a vertical axis. The oil level in the reservoir 37 is just enough to wet the rollers 7 of bearing 6 and not those of bearing 6'. But upon rotation of shaft 4, lubricant from reservoir 37 quickly fills up the entire well 13 by suction and recirculation of the lubricant takes place. In this manner both bearings 6 and 6' become continuously lubricated. In all other material respects system 66 operates as the previously described lubricating systems.

Concrete Cutting Saw

Figures 19, 20:
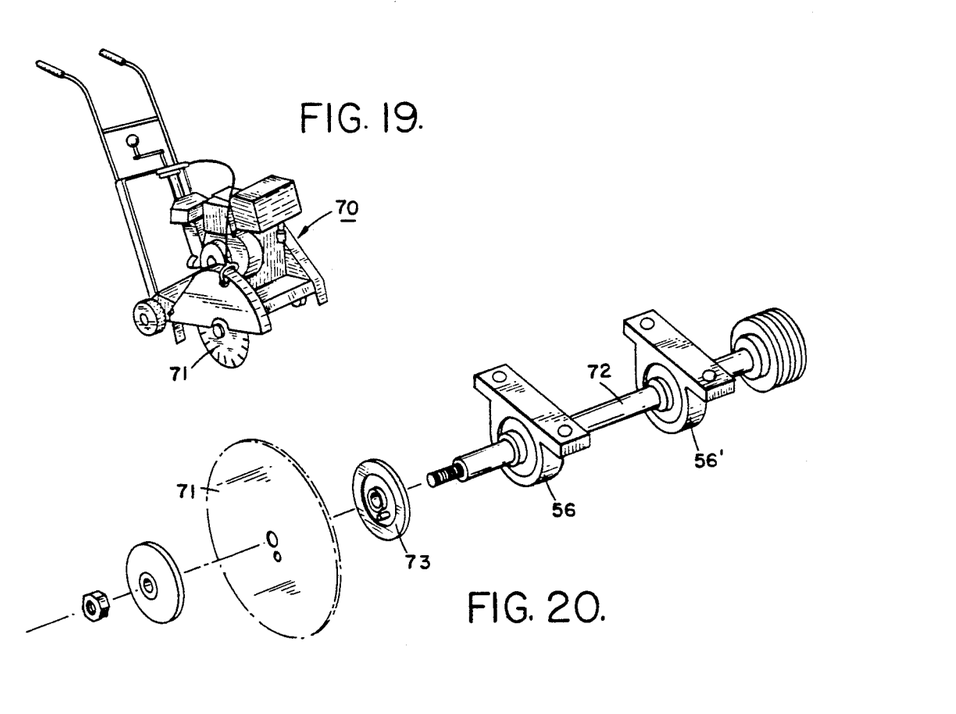
FIG. 19 is a simplified perspective view of a concrete saw utilizing the novel lubricating system of FIG. 14.
FIG. 20 is an exploded view of the arbor shaft assembly of the saw shown in FIG. 19.

In FIGS. 19 and 20 is shown a conventional concrete cutting saw 70 which must be able to rapidly obtain the required forward speed, operate at an infinitely variable speed, as well as in reverse speed. It uses a diamond blade 71 which receives in operation a sufficient supply of water on both sides of the blade. The blade is mounted on an arbor shaft 72 by means of a blade collar 73, and the shaft is supported by bearings 56,56' shown in FIGS. 14-15.

Blade 71 must not exceed a speed of about 8,000 FPM to retain the coolant water on its surfaces in sufficient quantity to prevent excessive heat buildup.

Shaft support bearings 56,56' must be rotated at high speeds in a very dirty and corrosive environment. The self lubricating system of the present invention provides an adequate supply of lubricant in order (1) to protect against wear the engaging surfaces of bearings 56,56', (2) to reduce the power consumption, and to (3) flush out debris, wear products and water from the bearings, so as to continuously maintain their rollers 7 clean, cool, and properly lubricated.

After each day's operation, the shaft support bearings 56, 56' no longer need to be lubricated, as is now required with grease lubrication. Since the bearing's seals are not required to open to allow for the discharge of the dirty grease to take place, foreign matter and water are not being sucked back into the bearings.

Less frequent bearing replacement is now required thereby reducing the cost of labor and of the down time for the concrete saw. Also, less blades are utilized per concrete cutting job thereby saving thousands of dollars per year per machine.

What is claimed is:

1. An apparatus for controllably circulating liquid lubricant through a bearing supporting a rotating shaft, comprising:

a pressure pump mounted on said shaft adjacent to said bearing and being powered by said shaft to create a pumping action;

said pump having a discharge outlet in fluid communication with one side of said bearing; and a liquid lubricant filter coupled to said discharge outlet of said pump, whereby when said shaft is rotating, said pump raising the pressure of said liquid lubricant flowing therethrough by an amount sufficient to maintain liquid lubricant flow across said filter and adequate liquid lubricant suction across said bearing so that, during each full cycle, liquid lubricant flows from said discharge outlet through said filter, through said one side of said bearing, through and across said bearing, through the opposite side of said bearing, and returns back to said pump, thereby lubricating and cleansing the contact surfaces of said bearing.

2. In a lubricating system for a bearing mounted in a casing adapted to contain liquid lubricant therein, said bearing being adapted to support a rotating shaft, the improvement comprising:

an impeller carried by said shaft for rotation therewith adjacent to one side of said bearing;

said casing defining a channel and a generally cylindrical well around said impeller having an arcuate peripheral rim opposite to the wall of said well; and a filter in said channel, whereby upon rotation of said shaft, said impeller (1) continuously expels liquid lubricant from said well, (2) propels said expelled lubricant under pressure through said channel and through said filter, and (3) sucks clean liquid lubricant from said one side to the opposite side of said bearing, thereby continuously and effectively recycling said lubricant through and across said bearing and lubricating and cleansing the surfaces of said bearing.

3. In a lubricating system for a bearing containing a liquid lubricant therein and supporting a shaft for rotation about its longitudinal axis, said bearing having a front side and a rear side, the improvement comprising:

an impeller carried by said shaft for rotation therewith adjacent to said front side of said bearing;

a reservoir for supplying liquid lubricant to said rear side of said bearing;

a casing enclosing said bearing, shaft, and reservoir;

said casing having a generally cylindrical well around said impeller, said well having at least one arcuate cavity opposite to a portion of said impeller, and said cavity being eccentric to said shaft's axis; and said casing having a return passage between said cavity and said reservoir;

said impeller having at least two diametrically-opposed, radially-extending vanes, and each vane having an outwardly flared outer end portion terminating in an arcuate peripheral rim opposite to said cavity; and upon rotation of said shaft, said impeller, in cooperation with said cavity, continuously (1) sucks said liquid lubricant through said bearing from its rear side to its front side, (2) expels said lubricant from said cavity, and (3) propels said expelled lubricant through said return passage into said reservoir, thereby continuously and effectively recycling said lubricant through said bearing and lubricating the surfaces thereof.

4. A controlled-flow bearing lubricating system, comprising:

at least one bearing having a front side and a rear side;

a shaft having a longitudinal axis;

said bearing supporting said shaft for rotation about said axis;

an impeller carried by said shaft for rotation therewith adjacent to said front side of said bearing;

a reservoir for supplying liquid lubricant to said rear side of said bearing;

a casing enclosing said bearing, shaft, and reservoir; said casing having a generally cylindrical well around said impeller, said well having at least one arcuate cavity opposite to a portion of said impeller, and said cavity being eccentric to said shaft's axis; and said casing having a return passage between said cavity and said reservoir;

said impeller having at least two diametrically-opposed, radially-extending vanes, and each vane having an outwardly flared outer end portion terminating in an arcuate peripheral rim opposite to said cavity; and upon rotation of said shaft, said impeller, in cooperation with said cavity, continuously (1) sucks said liquid lubricant through said bearing from its rear side to its front side, (2) expels said lubricant from said cavity, and (3) propels said expelled lubricant through said return passage into said reservoir, thereby continuously and effectively recycling said lubricant through said bearing and lubricating the surfaces thereof.

5. An apparatus for controllably circulating liquid lubricant through a bearing having an inlet side and a discharge side for supporting a rotating shaft having a longitudinal axis, comprising:

a liquid pumping mechanism concentrically mounted on and powered by said shaft for rotation therewith to create a pumping action;

a casing for containing a volume of liquid lubricant having a body (1) sealingly receiving said rotating shaft, (2) enclosing said bearing and said pumping mechanism, and (3) defining externally of said bearing a return lubricant flow channel in fluid communication with said inlet side of said bearing;

a liquid lubricant reservoir in said return channel and being enclosed within said casing, and said reservoir supplying liquid lubricant to said inlet side of said bearing;

said pumping mechanism having means for raising the pressure of the liquid lubricant flowing therethrough by an amount sufficient to compensate for the pressure drop across said return channel so as to maintain a predetermined liquid lubricant flow across said bearing, whereby when said pumping mechanism is rotating with said shaft during each flow cycle, liquid lubricant flows from said inlet side of said bearing, through and across said bearing, said discharge side of said hearing, said pumping mechanism, said return channel into said reservoir, and returns back to said inlet side of said bearing, thereby controllably lubricating the contact surfaces of said bearing; and a filter element in said reservoir for filtering out foreign matter from said returning liquid lubricant flowing into said reservoir.

6. An apparatus for controllably circulating liquid lubricant through a bearing having an inlet side, a discharge side, an inner race, an outer race, and bearing elements between said races for supporting a rotating shaft having a longitudinal axis, comprising:

a circular liquid pumping mechanism having an overall diameter corresponding substantially to the outside diameter of said bearing, and being concentrically mounted on and powered by said shaft for rotation therewith to create a pumping action;

a casing for containing a volume of liquid lubricant having a body (1) sealingly receiving said rotating shaft, (2) enclosing said bearing and said pumping mechanism, and (3) defining externally of said bearing a return lubricant flow channel in fluid communication with said inlet side of said bearing; and said pumping mechanism having means for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said pumping mechanism, said return channel, and returns back to said inlet side of said bearing, thereby controllably lubricating the contact surfaces of said bearing.

7. An apparatus for controllably circulating liquid lubricant through a bearing having an inlet side and a discharge side for supporting a rotating shaft having a longitudinal axis, comprising:

a liquid pumping mechanism concentrically mounted on and powered by said shaft for rotation therewith to create a pumping action;

a casing having a body (1) sealingly receiving said rotating shaft, (2) enclosing said bearing, (3) surrounding said pumping mechanism with a defined clearance therebetween to form a defined pumping chamber having a discharge outlet, (4) defining externally of said bearing a return lubricant flow channel in fluid communication with said inlet side of said bearing, and (5) for containing a volume of liquid lubricant flowing from said discharge side of said bearing into said pumping chamber;

said pumping mechanism having means for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said discharge outlet of said pumping chamber, said return channel, and returns back to said inlet side of said bearing, thereby controllably lubricating the contact surfaces of said bearing; and a filter element in said return channel for filtering out foreign matter from said returning liquid lubricant.

8. An apparatus for controllably circulating liquid lubricant through a bearing having an inlet side and a discharge side for supporting a rotating shaft having a longitudinal axis, comprising:

a liquid pumping mechanism concentrically mounted on said shaft for rotation therewith to create a pumping action;

a casing having a body (1) sealingly receiving said rotating shaft, (2) enclosing said bearing, (3) surrounding said pumping mechanism with a defined clearance therebetween to form a defined pumping chamber having a discharge outlet, (4) defining externally of said bearing a return lubricant flow channel in fluid communication with said inlet side of said bearing, and (5) for containing a volume of liquid lubricant flowing from said discharge side of said bearing into said pumping chamber;

said bearing containing liquid lubricant at the start of said shaft's rotation;

said pumping mechanism having means for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows exclusively from said inlet side of said bearing, through and across said bearing, and flows from said discharge side of said bearing through said discharge outlet of said pumping chamber, said return channel, and returns back to said inlet side of said bearing, thereby controllably lubricating the contact surfaces of said bearing; and a filter element in said return channel for filtering out foreign matter from said returning liquid lubricant.

9. An apparatus for controllably circulating liquid lubricant through a bearing having an inner race, an outer race, and bearing elements between said races, said bearing elements defining therebetween axial inlet flow passages, said bearing having an inlet side and a discharge side for supporting a rotating shaft having a longitudinal axis, comprising:

a liquid pumping mechanism concentrically mounted on and powered by said shaft for rotation therewith to create a pumping action;

a casing having a body (1) sealingly receiving said rotating shaft, (2) enclosing said bearing and said pumping mechanism with a defined clearance therebetween to form a pumping chamber having at least one expanding cavity gradually tapering outwardly over an arcuate extent toward a discharge outlet from said cavity, (4) defining externally of said bearing a return lubricant flow channel in fluid communication with said inlet side of said bearing, and (5) for containing a volume of liquid lubricant flowing from said discharge side of said bearing into said pumping chamber; and said pumping mechanism having means including an outer peripheral wall in defined spaced relation to said eccentric cavity so as to raise the pressure of the liquid lubricant flowing through said cavity by an amount sufficient to maintain a predetermined liquid lubricant flow across said bearing, whereby when said pumping mechanism is rotating with said shaft during each flow cycle, liquid lubricant flows from said inlet side of said bearing, through consecutive ones of said inlet flow passages, through and across said bearing, through said discharge side of said bearing, through said discharge outlet of said cavity, through said return channel, and returns back to said inlet side of said bearing, thereby controllably lubricating the contact surfaces of said bearing.

10. An apparatus for controllably circulating liquid lubricant through a bearing having an inlet side and a discharge side for supporting a rotating shaft having a longitudinal axis, comprising:

a liquid pumping mechanism concentrically mounted on and powered by said shaft for rotation therewith to create a pumping action;

a casing for containing a volume of liquid lubricant having a body (1) sealingly receiving said rotating shaft, (2) enclosing said bearing and said pumping mechanism, and (3) defining externally of said bearing a return lubricant flow channel in fluid communication with said inlet side of said bearing; and said pumping mechanism having means including at least two diametrically-opposed, radially-extending vanes for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said pumping mechanism, said return channel, and returns back to said inlet side of said bearing, thereby controllably lubricating the contact surfaces of said bearing.

11. The apparatus for circulating liquid lubricant according to claim 10, wherein
said casing defines an arcuate cavity opposite to said pumping mechanism, and
each vane has an outwardly flared outer end portion terminating in an arcuate peripheral rim rotating opposite to said arcuate cavity.

12. An apparatus for controllably circulating liquid lubricant through a bearing having an inlet side and a discharge side for supporting a rotating shaft having a longitudinal axis, comprising:
a liquid pumping mechanism concentrically mounted on and powered by said shaft for rotation therewith to create a pumping action;
a casing for containing a volume of liquid lubricant having a body (1) sealingly receiving said rotating shaft, (2) enclosing said bearing and said pumping mechanism, (3) defining externally of said bearing a return flow channel in fluid communication with said inlet side of said bearing, and (4) defining a generally cylindrical well around said pumping mechanism for receiving liquid lubricant from said discharge side of said bearing;
said well having at least one arcuate cavity opposite to a portion of said pumping mechanism, and said cavity having a discharge outlet in fluid communication with said return channel; and
said pumping mechanism having means for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said pumping mechanism, said return channel, and returns back to said inlet side of said bearing, thereby controllably lubricating the contact surfaces of said bearing.

13. The apparatus for circulating liquid lubricant according to claim 12, wherein
said arcuate cavity is eccentric to the shaft's axis; and
said pumping mechanism operatively cooperates with said cavity to raise the pressure of said circulating liquid lubricant.

14. The apparatus for circulating liquid lubricant according to claim 13, wherein
the pressure and the velocity of said liquid lubricant at the discharge outlet of said cavity are dependent on the eccentricity of said arcuate cavity and on the shape of said pumping mechanism.

15. The apparatus for circulating liquid lubricant according to claim 13, and
a filter element in said return channel for filtering out foreign matter from said returning liquid lubricant; and
said pressure rise of said circulating liquid lubricant is sufficient to compensate for the pressure drop in said circulating liquid lubricant as it flows across said return channel.

16. An apparatus for controllably circulating liquid lubricant through a bearing having an inlet side and a discharge side for supporting a rotating shaft having a longitudinal axis, comprising:

a liquid pumping mechanism concentrically mounted on and powered by said shaft for rotation therewith to create a pumping action;
a casing for containing a volume of liquid lubricant having a body (1) sealingly receiving said rotating shaft, (2) enclosing said bearing and said pumping mechanism, and (3) defining externally of said bearing a return lubricant flow channel in fluid communication with said inlet side of said bearing;
said pumping mechanism having means for raising the pressure of the liquid lubricant flowing therethrough by an amount sufficient to compensate for the pressure drop across said return channel so as to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said pumping mechanism, said return channel, and returns back to said inlet side of said bearing, thereby controllably lubricating the contact surfaces of said bearing; and
a filter element in said return channel for filtering out foreign matter from said returning liquid lubricant.

17. An apparatus for controllably circulating liquid lubricant according to claim 16, wherein
said pumping mechanism is immediately adjacent to said discharge side of said bearing.

18. An apparatus for controllably circulating liquid lubricant according to claim 16, and further including:
another bearing for supporting said shaft;
said pumping mechanism is concentrically carried on said shaft intermediate said bearings;
said shaft extends through said casing; and
a pair of end seals for sealing off the portion of said shaft extending through said casing.

19. An apparatus for circulating liquid lubricant through a bearing according to claim 18, wherein
said casing has a bore between a pair of axially-opposed openings;
a pair of end seals sealing off the opposite ends of said bore from the ambient; and
said pumping mechanism has at least two diametrically-opposed radial vanes, and each consecutive pair of vanes defining a pocket therebetween for accepting liquid lubricant therein.

20. An apparatus for controllably circulating liquid lubricant through a bearing having an inlet side and a discharge side for supporting a rotating shaft having a longitudinal axis, comprising:
a generally circular liquid pumping mechanism having an outer diameter corresponding substantially to the outer diameter of said bearing and being concentrically mounted on and powered by said shaft for rotation therewith to create a pumping action;
a casing having a body (1) sealingly receiving said rotating shaft, (2) enclosing said bearing, (3) surrounding said pumping mechanism with a defined clearance therebetween to form a defined pumping chamber having a discharge outlet, (4) defining externally of said bearing a return lubricant flow channel in fluid communication with said inlet side of said bearing, and (5) for containing a volume of liquid lubricant flowing from said discharge side of said bearing into said pumping chamber; and said pumping mechanism having means for raising the pressure of the liquid lubricant flowing therethrough by an amount sufficient to maintain a predetermined liquid lubricant flow across said bearing, whereby when said pumping mechanism is rotating with said shaft during each flow cycle, liquid lubricant flows from said inlet side of said bearing, through and across said bearing, said discharge side of said bearing, said discharge outlet of said pumping chamber, said return channel, and returns back to said inlet side of said bearing, thereby controllably lubricating the contact surfaces of said bearing.

a filter element in said return channel for filtering out foreign matter from said returning liquid lubricant.

21. An apparatus for controllably circulating liquid lubricant according to claim 20, wherein said bearing contains liquid lubricant at the start of said shaft's rotation, and said returning liquid lubricant flows exclusively through and across said bearing.

22. The apparatus for circulating liquid lubricant according to claim 21, and a filter element in said return flow channel for filtering out foreign matter from said returning liquid lubricant.

23. The apparatus for supporting a rotating shaft according to claim 20, wherein said lubricant pumping mechanism has at least two diametrically-opposed radial vanes, and each consecutive pair of vanes defines a pocket therebetween for accepting liquid lubricant therein.

24. A lubricating system for a bearing rotatably supporting a shaft, said bearing having a rear side and a front side and being adapted to contain a liquid lubricant therein;

a pumping member carried by said shaft adjacent to said front side of said bearing for rotation with said shaft;

a housing having a body (1) surrounding said bearing, (2) having a well around said pumping member, (3) having an inner portion extending beyond said bearing through which said shaft extends, and (4) having another inner portion forming a lubricant reservoir adjacent to said bearing so as to allow lubricant to freely flow by gravity from said reservoir into said well through said rear side of said bearing; and when rotating within said well, said pumping member (1) drawing lubricant out from said reservoir, (2) forcefully injecting it into said rear side of said bearing, (3) pumping it from said rear side to said front side of said bearing, (4) pressurizing it within said well, and (5) returning it back to said reservoir for recirculation through and across said bearing, thereby cleaning and lubricating the engaging surfaces of said bearing.

25. A bearing lubricating system according to claim 24, and a filter in said reservoir for filtering out foreign matter from said recirculating lubricant.

26. A bearing lubricating system according to claim 25, wherein said housing defines at least one arcuate cavity in and around a portion of the wall of said well opposite to said pumping member, said cavity having a discharge outlet; and said pumping member in cooperation with said cavity intensifies the lubricant flow from said rear side of said bearing into said cavity and thence into said reservoir.

27. A bearing lubricating system according to claim 26, wherein said shaft has a longitudinal axis;

said cavity is eccentric to said shaft's axis; and said intensifying of said lubricant flow being dependent on the shape of said eccentric cavity and of said pumping member.

28. A bearing lubricating system according to claim 26, wherein said shaft is rotatable substantially about a vertical axis; and said pumping member is carried by said shaft above said bearing.

29. A bearing lubricating system according to claim 26, wherein said pumping member is an annular impeller having a plurality of radially extending vanes positioned substantially tangentially to said cavity; and a return passage coupling said discharge outlet from said arcuate cavity with the inlet to said reservoir.

30. A bearing lubricating system according to claim 29, wherein each one of said vanes is characterized by an outwardly flared outer end portion terminating in an arcuate peripheral rim between radial side ribs; and each opposite pair of side ribs between two adjacent vanes defining a pocket therebetween for accepting lubricant therein.

31. A bearing lubricating system according to claim 30, and another arcuate eccentric cavity in and around a portion of said well and extending in an opposite direction from said one cavity; and means including a pair of return passages for returning the compressed lubricant from said cavities into said reservoir.

32. A bearing lubricating system according to claim 31, and a uni-directional valve in each return passage for allowing only one of said cavities to return the intensified lubricant to said reservoir, depending upon the direction of shaft rotation, thereby ensuring bearing lubrication in either direction of shaft rotation.

* * * * *